United States Patent
Angquist

(10) Patent No.: US 8,374,810 B2
(45) Date of Patent: Feb. 12, 2013

(54) METHOD AND APPARATUS FOR CALCULATING INSERTION INDICES FOR A MODULAR MULTILEVEL CONVERTER

(75) Inventor: Lennart Angquist, Enkoping (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 13/412,393

(22) Filed: Mar. 5, 2012

(65) Prior Publication Data

US 2012/0191391 A1 Jul. 26, 2012

Related U.S. Application Data

(63) Continuation of application No. PCT/EP2010/062923, filed on Sep. 3, 2010.

(60) Provisional application No. 61/239,859, filed on Sep. 4, 2009.

(51) Int. Cl.
  *G01R 19/00* (2006.01)
(52) U.S. Cl. ......................................... 702/64
(58) Field of Classification Search ...... 702/64
  See application file for complete search history.

(56) References Cited

U.S. PATENT DOCUMENTS

2010/0067266 A1* 3/2010 Dommaschk et al. .......... 363/64

FOREIGN PATENT DOCUMENTS

| DE | 10103031 A1 | | 7/2002 |
|---|---|---|---|
| SU | 1078342 | * | 3/1984 |
| WO | 2008067784 A1 | | 6/2008 |
| WO | WO 2011026927 | * | 3/2011 |

OTHER PUBLICATIONS

English Abstract of SU 1078342, Mar. 1984.*
International Search Report and Written Opinion of the International Searching Authority; Application No. PCT/EP2010/062923; Issued: Jan. 20, 2011; Mailing Date: Jan. 31, 2011; 10 pages.

* cited by examiner

*Primary Examiner* — Michael Nghiem
(74) *Attorney, Agent, or Firm* — St. Onge Steward Johnston & Reens LLC

(57) ABSTRACT

A method for calculating insertion indices for a phase leg of a DC to AC modular multilevel converter. Each phase leg includes two serially connected arms, wherein each arm includes a number of submodules, wherein each submodule can be in a bypass state or a voltage insert mode. The insertion index includes data representing the portion of available submodules that should be in the voltage insert mode. The method includes the steps of: calculating a desired arm voltage for an upper arm connected to the upper DC source common bar and a lower arm connected to the lower DC source common bar, obtaining values representing actual total arm voltages in the upper arm and lower arm, respectively, and calculating modulation indices for the upper and lower arm, respectively, using the respective desired arm voltage and the respective value representing the total actual arm voltage. A corresponding apparatus is also presented.

11 Claims, 9 Drawing Sheets

METHOD AND APPARATUS FOR CALCULATING INSERTION INDICES FOR A MODULAR MULTILEVEL CONVERTER

CROSS-REFERENCE TO RELATED APPLICATIONS

The present application is a continuation of pending International patent application PCT/EP2010/062923 filed on Sep. 3, 2010 which designates the United States and claims the benefit under 35 U.S.C. §119 (e) of the U.S. Provisional Patent Application Ser. No. 61/239,859 filed on Sep. 4, 2009. The content of all prior applications is incorporated herein by reference.

FIELD OF THE INVENTION

The invention relates to the calculation of insertion indices comprising data representing the portion of available submodules of a modular multilevel converter that should be in voltage insert mode.

BACKGROUND OF THE INVENTION

The concept Modular Multilevel Converter (M2C) denotes a class of Voltage Source Converter (VSC). It has one or several phase legs connected in parallel between two DC bars, a positive DC+ and a negative DC−. Each phase leg consists of two series-connected converter arms. The connection point between the converter arms constitutes an AC terminal for the leg.

Each arm consists of a number (N) of submodules. Each submodule has two terminals. Using these terminals the submodules in each arm are series-connected so that they form a string. The end terminals of the string constitute the connection terminals of the arm. By controlling individual modules in each arm, a voltage corresponding to the accumulation of insertion voltages can be provided on the AC terminal.

Such a converter is known from DE10103031. In this document, a method to equalize the voltages in the submodule capacitors within the arm is briefly described. For each arm, a modulator determines when the number of inserted submodules shall change. The principle for equalizing is that, at each instant when a change of the number of inserted submodules is commanded, a selection mechanism chooses the submodule to be inserted or bypassed depending on the actual current direction in the arm (charging or discharging) and the corresponding available submodules in the arm (bypassed highest voltage/bypassed lowest voltage/inserted highest voltage/inserted lowest voltage). Such a selection mechanism aims to achieve that the DC voltage across the DC capacitors in the submodules are equal, $u_{C,SM}(t)$.

A problem with the prior art is the presence of a circulation current going through the legs between the DC terminals.

SUMMARY OF THE INVENTION

An object of the invention is to reduce circulation currents going through the legs between the DC terminals.

A first aspect is a method for calculating insertion indices for a phase leg of a DC to AC modular multilevel converter, the converter comprising one phase leg between upper and lower DC source common bars for each phase, each phase leg comprising two serially connected arms, wherein an AC output for each phase leg is connected between its two serially connected arms. Each arm comprises a number of submodules, wherein each submodule can be in a bypass state or a voltage insert mode, the insertion index comprising data representing the portion of available submodules that should be in the voltage insert mode for a particular arm. The method comprises the steps of: calculating a desired arm voltage for an upper arm connected to the upper DC source common bar and a lower arm connected to the lower DC source common bar, obtaining values representing actual total arm voltages in the upper arm and lower arm, respectively, and calculating insertion indices for the upper and lower arm, respectively, using the respective desired arm voltage and the respective value representing the total actual arm voltage.

The step of calculating desired arm voltages for a phase leg may comprise calculating $$u_{CU}(t) = u_D/2 - e_V(t) - u_{diff}(t)$$

for the upper arm, and calculating $$u_{CL}(t) = u_D/2 + e_V(t) - u_{diff}(t)$$

for the lower arm, where $u_{CL}(t)$ represents upper arm voltage, $u_D$ represents a voltage between the upper and lower DC source common bars, $e_V(t)$ represents a reference inner AC output voltage and $u_{diff}(t)$ represents a control voltage to control a current passing through the whole phase leg.

The step of calculating a desired arm voltage may comprise calculating $$u_{diff}(t) = u_{diff1}(t) + u_{diff2}(t)$$

where $u_{diff1}(t)$ represents a voltage obtained by summing energy in the arms of the leg and $u_{diff2}(t)$ represents a voltage obtained by calculating a difference in energy between the arms of the leg.

The step of obtaining a value representing actual arm voltage may comprise calculating $$u_{diff2}(t) = \hat{u}_{diff2} \cos(\omega_1 t + \psi)$$

where $\hat{u}_{diff2}$ represents an error between total upper arm energy and total lower arm energy, $\omega_1$ represents the angular velocity of the network frequency and $\psi$ represents the angle given by $\psi = \angle(R + j\omega_1 L)$ where R represents the resistance of the converter arm and L represents the inductance of the converter arm.

The step of obtaining values representing actual arm voltages may comprise: calculating $u_{CU}^{\Sigma(t)}$, actual voltage for the upper arm, using $C_{arm}$, capacitance for the arm, $i_{diff0}$, DC current passing through the two serially connected arms of the phase leg, $W_{CU}^{\Sigma}(t)$, desired average energy in the upper arm, $\hat{e}_V$, amplitude of reference for the inner AC output voltage, $\hat{i}_V$, amplitude of AC output current, $\phi$, a phase difference between $i_V(t)$ and $e_V(t)$, and calculating $u_{CL}^{\Sigma}(t)$, actual voltage for the lower arm, using $C_{arm}$, capacitance for the arm, $i_{diff0}$, DC current passing through the two serially connected arms of the phase leg, $W_{CL}^{\Sigma}(t)$, desired average energy in the lower arm, $\hat{e}_V$, amplitude of reference for inner AC output voltage, $\hat{i}_V$, amplitude of AC output current, $\phi$, a phase difference between $i_V(t)$ and $e_V(t)$.

The step of obtaining a value representing actual arm voltage may comprise calculating $$\hat{i}_{diff0} = \frac{\hat{e}_v \hat{i}_v \cos\varphi}{u_D + \sqrt{u_D^2 - 4R\hat{e}_v \hat{i}_v \cos\varphi}}$$

where $\phi$ represents a phase difference between $i_V(t)$ and $e_V(t)$, $u_D$ represents a voltage between the upper and lower DC source common bars and R represents the resistance of the converter arm.

The step of obtaining a value representing actual arm voltage may comprise calculating $$u_{CU}^{\Sigma}(t) = \sqrt{\frac{2W_{CU}^{\Sigma}(t)}{C_{arm}}}$$

where $W_{CU}^{\Sigma}(t)$ represents instantaneous energy in the upper arm and is calculated as follows:

$$W_{CU}^{\Sigma}(t) = W_{CU0}^{\Sigma} - \frac{\hat{e}_v \hat{i}_{diff0}}{\omega_1} \sin\omega_1 t +$$

$$\left(\frac{u_D}{2} - R\hat{i}_{diff0}\right)\frac{\hat{i}_v}{2\omega_1}\sin(\omega_1 t + \varphi) - \frac{\hat{e}_v \hat{i}_v}{8\omega_1}\sin(2\omega_1 t + \varphi)$$

and calculating $$u_{CL}^{\Sigma}(t) = \sqrt{\frac{2W_{CL}^{\Sigma}(t)}{C_{arm}}}$$

where $W_{CL}^{\Sigma}(t)$ represents instantaneous energy in the lower arm and is calculated as follows:

$$W_{CL}^{\Sigma}(t) = W_{CL0}^{\Sigma} + \frac{\hat{e}_v \hat{i}_{diff0}}{\omega_1} \sin\omega_1 t -$$

$$\left(\frac{u_D}{2} - R\hat{i}_{diff0}\right)\frac{\hat{i}_v}{2\omega_1}\sin(\omega_1 t + \varphi) - \frac{\hat{e}_v \hat{i}_v}{8\omega_1}\sin(2\omega_1 t + \varphi)$$

where $\omega_1$ represents the angular velocity of the network frequency, $u_D$ represents a voltage between the upper and lower DC source common bars, R represents the resistance of the converter arm.

The step of obtaining a value representing actual arm voltage may comprise measuring voltages of the submodules of the arm and summing these measured voltages.

The insertion index may comprise data representing a direction of the inserted voltage.

A second aspect is an apparatus for calculating insertion indices for a phase leg of a DC to AC modular multilevel converter, the converter comprising one phase leg between upper and lower DC source common bars for each phase, each phase leg comprising two serially connected arms, wherein an AC output for each phase leg is connected between its two serially connected arms, wherein each arm comprises a number of submodules. Each submodule can be in a bypass state or a voltage insert mode, the insertion index comprising data representing the portion of available submodules that should be in the voltage insert mode for a particular arm. The apparatus comprises a controller arranged to calculate a desired arm voltage for an upper arm connected to the upper DC source common bar and a lower arm connected to the lower DC source common bar, to obtain values representing actual total arm voltages in the upper arm and lower arm, respectively, and to calculate modulation indices for the upper and lower arm, respectively, using the respective desired arm voltage and the respective value representing the total actual arm voltage.

Generally, all terms used in the application are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION OF THE INVENTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In the description in the following, continuous variables are used, corresponding to the simplifying assumption that the arms have infinite number of submodules that are switched with infinite switching frequency.

Figure 1:
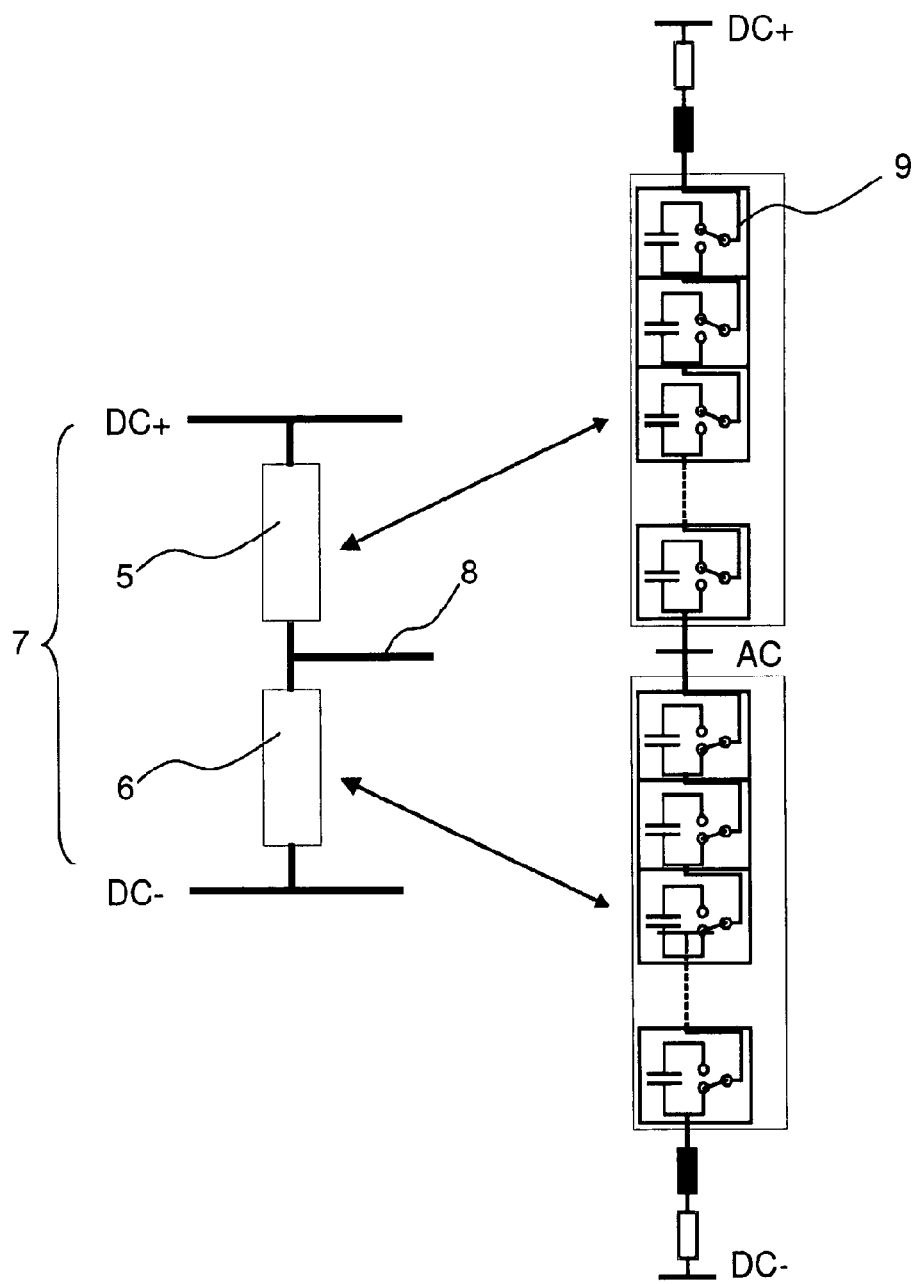
FIG. 1 is a schematic diagram of phase legs and arms.

FIG. 1 shows an M2C (Modular Multilevel Converter) having a phase leg 7 that comprising an upper arm 5 and a lower arm 6. Each arm 5, 6 comprising a number of serially connected submodules 9. Each submodule 9 comprises a switchable capacitor. An AC output 8 is connected between the upper and lower arms 5, 6. Although only one phase leg 7 is shown here, the M2C comprises one phase leg 7 for each phase, i.e. three phase legs 7 for a three phase system, where each phase leg 7 comprises upper and lower arms 5, 6 comprising submodules 9.

An upper DC source common bar (in this case DC+) and a lower DC source common bar (in this case DC−) for each phase is provided. It is to be noted that the upper and lower DC source common bars can switch polarity.

Ideally the capacitors keep a constant DC voltage and the AC terminal voltage is controlled by varying the number of inserted modules in the upper and lower arms. If the voltage between the DC bars is constant this obviously requires that, in average, the total number of inserted modules in the two arms remain constant. The arm inductors however will limit the rate of change of the arm currents, making it possible to accept minor short deviations from this condition.

Now once the context is presented, define the insertion index, $n_x(t)$, for the arm x to be the ratio between the inserted number of submodules and the total number of available submodules in the arm. The arm voltage then becomes $$u_{Cx}(t) = n_x(t) u_{C,SM}(t) \quad (1)$$

In a simple approach the number of inserted modules in each arm can be generated by the modulator much in the same way as in PWM modulation for conventional VSCs. Then, in order to generate an inner AC voltage with amplitude $\hat{e}_V$ the insertion indices for the upper and the lower arms become $$u_{CU}(t) = n_U(t) u_D \quad u_{CL}(t) = n_L(t) u_D \quad (2)$$

$$n_U(t) = \frac{1 - \hat{m}\cos\omega t}{2} \quad n_L(t) = \frac{1 - \hat{m}\cos\omega t}{2}$$

$$\hat{m} = \frac{\hat{e}_V}{\frac{u_D}{2}}$$

When the simple modulation approached described above is used and the converter is loaded on its AC side the desired waveform will be distorted due to the ripple in the capacitor voltages that will be created when the load current passes through the converter arms. Specifically a strong second harmonic current will circulate through the converter leg and the DC side and/or the neighbor phases. This undesired second harmonic current increases the peak of the arms currents and causes extra losses in the converter arms.

The problem can be solved by generating the insertion indices for the arms, $n_U$ and $n_L$, in other ways. Such methods would aim to:
  eliminate and/or control the harmonic current in the converter arms
  for each arm control the total energy stored in all capacitors in that arm which is equivalent to control the total voltage of all capacitors in the arm
  thereby control the total energy stored in the phase leg as well as the balance between the upper and the lower arms in the phase leg According to the invention the insertion indices $n_U(t)$ and $n_L(t)$ for the converter arms are being derived in real-time according to the following procedure
  the reference for the converter inner voltage relative the midpoint of the DC link is given in the form $e_V(t) = \hat{e}_V \cos \omega_1 t$; this reference typically is delivered by an AC side controller operating on AC quantities like output voltage, current or flux; the converter circuit parameters like arm resistance and inductance may be used by the controller
  the desired arm voltages $u_{CU}(t)$ and $u_{CL}(t)$ are calculated as $$u_{CU}(t) = \frac{u_D}{2} - e_V(t) - u_{diff}(t) \quad u_{CL}(t) = \frac{u_D}{2} + e_V(t) - u_{diff}(t) \quad (3)$$

where $u_D$ is the voltage between the DC rails and $u_{diff}(t)$ is a control voltage that is created by the control system that will be described later in the this memo
  the total capacitor voltages, $u_{CU}^\Sigma(t)$ and $u_{CL}^\Sigma(t)$, of all capacitors in the upper and lower arms respectively, are measured or estimated as will be described later in this memo the insertion indices are calculated as $$n_U(t) = \frac{u_{CU}(t)}{u_{CU}^\Sigma(t)} \quad n_L(t) = \frac{u_{CL}(t)}{u_{CL}^\Sigma(t)} \quad (4)$$

According to the invention there are two different ways to create the variables $u_{diff}(t)$, $u_{CU}^\Sigma(t)$ and $u_{CL}^\Sigma(t)$.

In this approach the sum of the capacitor voltages in each arm, $u_{CU}^\Sigma(t)$ and $u_{CL}^\Sigma(t)$, are measured using sensors in the submodules. If the voltage sharing between the modules is assumed to be even the total energies in each arm can be calculated as $$W_{CU}^\Sigma(t) = \frac{C_{arm}}{2} u_{CU}(t)^2 \quad W_{CL}^\Sigma(t) = \frac{C_{arm}}{2} u_{CL}(t)^2 \quad (5)$$

where $C_{arm} = C_{submod}/N$. Alternatively the energy in each arm capacitor can be calculated individually and the total energy for each arm then can be created by summing the energies in all submodules in each arm. The voltage reference component $u_{diff}(t)$ is created as the sum of the output signals from two independent controllers $u_{diff}(t) = u_{diff1}(t) + u_{diff2}(t)$.

The first controller has a reference for the total energy in both arms of the phase leg. The response signal is the measured total energy $W_{CU}^\Sigma(t) + W_{CL}^\Sigma(t)$ which may be filtered using e.g. a notch filter tuned to the frequency $2\omega_1$ ($\omega_1$ is the network frequency) or any other filter suppressing the same frequency. The error, i.e. the difference between the reference and the response signals, is connected to a controller (normally of type PID) that has the output signal $u_{diff1}(t)$.

The second controller has a reference for the difference between the energies in the arms in the phase leg. This reference typically is zero, meaning that the energy in the arms in the phase leg shall be balanced. The response signal is created as the measured $W_{CU}^\Sigma(t) - W_{CL}^\Sigma(t)$, filtered by a notch filter tuned to $\omega_1$ or any other filter suppressing the same frequency. The error is brought to a controller (typically of P type), which has an output signal $\hat{u}_{diff2}$. The contribution to the total voltage reference $u_{diff}(t)$ is obtained by multiplying $\hat{u}_{diff2}$ by a sinusoidal time function $\cos(\omega_1 t + \psi)$, which is phase-shifted relative the inner voltage reference by the angle $\psi$ given by $\psi = \angle(R + j\omega_1 L)$, where R and L are the resistance and inductance respectively in the converter arm. Thus:

$$u_{diff}(t) = u_{diff1}(t) + \hat{u}_{diff2} \cos(\omega_1 t + \psi) \quad (6)$$

The first approach to stabilisation of the converter according to the procedure described in this section is described in more detail in Appendix 1.

Remark 1: The reference for the AC side inner voltage may comprise a minor third harmonic voltage component, which is used to increase the available output voltage level in a 3-phase converter. This does not impact significantly on the behaviour described.

Remark 2: A third reference component may be added to the control voltage $u_{diff}(t)$. This component has the purpose of intentionally creating a second harmonic current in the arms in order to increase the available output voltage for loads with certain power factors.

Second Approach, Open-Loop Control

In this approach the AC side current $i_{V(t)}$ is measured. Its fundamental frequency component is extracted with amplitude and phase relative the reference inner voltage $e_{V(t)}$ for the converter. Thus the AC side current can be written as $$i_V(t) = \hat{i}_V \cos(\omega_1 t + \phi) \quad (7)$$

Assuming that the converter shall operate ideally in steady-state, i.e. it shall produce undisturbed AC output voltage and the upper and lower arms shall carry half the AC output current each, it is possible to calculate the ideal derivative of the energies in each arm. The result is $$\frac{dW_{CU}^{\Sigma}}{dt} = \qquad (8)$$
$$-\hat{e}_V \hat{i}_{diff0}\cos\omega_1 t + \left(\frac{u_D}{2} - R\hat{i}_{diff0}\right)\frac{\hat{i}_V}{2}\cos(\omega_1 t + \varphi) - \frac{\hat{e}_V \hat{i}_V}{4}\cos(2\omega_1 t + \varphi)$$

$$\frac{dW_{CL}^{\Sigma}}{dt} = \qquad (9)$$
$$+\hat{e}_V \hat{i}_{diff0}\cos\omega_1 t - \left(\frac{u_D}{2} - R\hat{i}_{diff0}\right)\frac{\hat{i}_V}{2}\cos(\omega_1 t + \varphi) - \frac{\hat{e}_V \hat{i}_V}{4}\cos(2\omega_1 t + \varphi)$$

where $\hat{i}_{diff0}$ is a DC current circulating through the two series-connected arms and the DC supply $$\hat{i}_{diff0} = \frac{\hat{e}_V \hat{i}_V \cos\varphi}{u_D + \sqrt{u_D^2 - 4R\hat{e}_V \hat{i}_V \cos\varphi}} \qquad (10)$$

When there is only a DC circulating current $\hat{i}_{diff0}$ then also the control voltage $u_{diff}(t)$ becomes a DC voltage with the value $u_{diff}(t)=R\hat{i}_{diff0}$ so that (3) becomes $$u_{CU}(t) = \frac{u_D}{2} - e_V(t) - R\hat{i}_{diff0} \quad u_{CL}(t) = \frac{u_D}{2} + e_V(t) - R\hat{i}_{diff0} \qquad (11)$$

Moreover, equations (8) and (9) can be integrated, each with a freely selected integration constant, so that $$W_{CU}^{\Sigma}(t) = W_{CU0}^{\Sigma} - \frac{\hat{e}_V \hat{i}_{diff0}}{\omega_1}\sin\omega_1 t + \qquad (12)$$
$$\left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

$$W_{CL}^{\Sigma}(t) = W_{CL0}^{\Sigma} + \frac{\hat{e}_V \hat{i}_{diff0}}{\omega_1}\sin\omega_1 t - \qquad (13)$$
$$\left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{4\omega_1}\sin(2\omega_1 t + \varphi)$$

Thus the instantaneous energies in each arm can be calculated in real-time knowing only the references for the inner converter voltage and the actual AC current. The integration constants are the references for the desired average energy in each arm in the phase leg.

But if the energies are known then also the total capacitor voltage in the arms are know due to the connection equations $$u_{CU}^{\Sigma}(t) = \sqrt{\frac{2W_{CU}^{\Sigma}(t)}{C_{arm}}} \quad u_{CL}^{\Sigma}(t) = \sqrt{\frac{2W_{CL}^{\Sigma}(t)}{C_{arm}}} \qquad (14)$$

Now the insertion indices valid for the desired steady-state operation can be calculated using equation (4). Given these insertion indices the energies in the upper and lower arms converges to the reference values given as free integration constants in (12) and (13). Normally these values are selected equal for both arms so that balanced operation is obtained. The value of the energy reference is selected to give the desired total capacitor voltage in each converter arm.

The second approach to stabilisation of the converter according to the procedure presented in this section is described in more detail in Appendix 2.

Remark 1: If a third harmonic voltage component (to increase the available voltage in a 3-phase converter) is added the formulas for the energies in the upper and lower arm will change somewhat. However the principle described in this paper still can be applied.

Remark 2: If even order harmonics are intentionally added to the circulating current the formulas for the energies in the upper and lower arms will change somewhat. The principle described above however still applies.

to derive a control strategy that provides main circuit stability
    to produce as high AC output voltage as possible with very low harmonic distortion
    to control the DC voltages of the capacitors in the modules
    Continuous Model It is of course possible to investigate the M2C converter by simulation. This approach however seems to be quite cumbersome in the sense that it involves detailed models of the arms (with tens of semiconductor devices in each). A lot of data will be generated making it more difficult to extract useful results.

Another approach, which will be followed here, makes use of a modulation principle that has been proposed by in DE10103031, in which a selection mechanism is used to determine which individual module that shall be inserted or bypassed when the number of devices in an arm shall be changed. The selection is made in dependence of the direction of the arm current (or phase current) and a comparison of the DC voltages in the congregation of modules in each arm, from which the modules having the highest and lowest voltages are identified.

Simulation has shown that this mechanism successfully keeps the DC voltages of the module capacitors quite close to each other, even for low number of modules in each arm (say e.g. five per arm). This functionality seems to remain even if the total switching frequency is low (a few hundred switchings per second for each semiconductor device).

Now it is assumed that this mechanism is in use and that accordingly there is no need to look at the DC voltages in the individual modules any more. The modulation process then can be described in terms of the total collective energy in each arm. As the total switching frequency (for all modules in each arm) becomes quite high continuous modelling can be used. The continuous model is a lot simpler to grasp than the detailed model and it is an ideal base for understanding the principles for the function of the M2C converter and to formulate control laws for different control aspects.

Due to the assumptions static relations exist between the total capacitor energy in the upper and lower arm, $W_{CU}^{\Sigma}$ and $W_{CL}^{\Sigma}$, and the corresponding total voltage of all capacitor modules in the arm, $u_{CU}^{\Sigma}$ and $u_{CL}^{\Sigma}$. Namely, if it is assumed that the energy is evenly shared between the modules, this relation becomes $$W_{CU}^{\Sigma} = N\left(\frac{C}{2}\left(\frac{u_{CU}^{\Sigma}}{N}\right)^2\right) = \frac{C}{2N}u_{CU}^{\Sigma 2} \quad u_{CU}^{\Sigma} = \sqrt{\frac{2N}{C}W_{CU}^{\Sigma}} \qquad (A1)$$

$$W_{CL}^{\Sigma} = N\left(\frac{C}{2}\left(\frac{u_{CL}^{\Sigma}}{N}\right)^2\right) = \frac{C}{2N}u_{CL}^{\Sigma 2} \quad u_{CL}^{\Sigma} = \sqrt{\frac{2N}{C}W_{CL}^{\Sigma}}$$

where N is the number of modules per arm and C is the capacitance per module. In the following we will use the quantity 'arm capacitance' $C_{arm}$ defined as follows $$C_{arm} = \frac{C}{N} \quad (A2)$$

Then $$W_{CU}^{\Sigma} = \frac{C_{arm}}{2}(u_{CU}^{\Sigma})^2 \quad u_{CU}^{\Sigma} = \sqrt{\frac{2W_{CU}^{\Sigma}}{C_{arm}}} \quad (A3)$$

$$W_{CL}^{\Sigma} = \frac{C_{arm}}{2}(u_{CL}^{\Sigma})^2 \Leftrightarrow u_{CL}^{\Sigma} = \sqrt{\frac{2W_{CL}^{\Sigma}}{C_{arm}}}$$

Derivation of the Continuous Model

Figure 2:
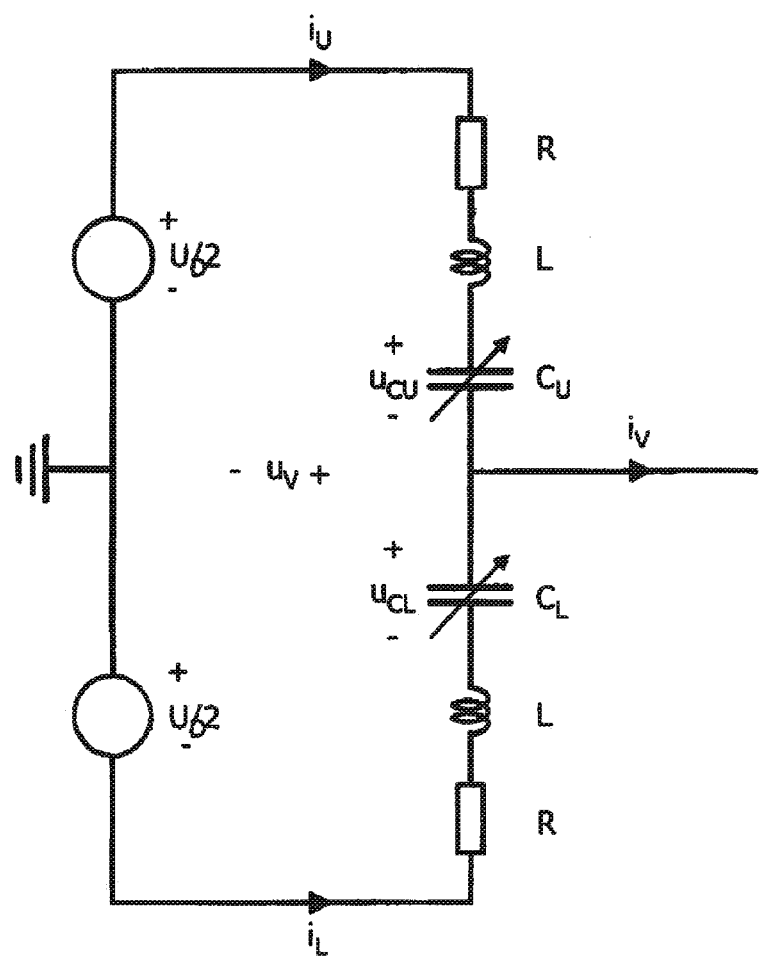
FIG. 2 is a schematic circuit model of a phase leg of FIG. 1.

The electrical circuit representing the phase leg of the M2C converter is depicted in FIG. 2. The inserted capacitor voltages, $U_{CU}$ and $U_{CL}$, are created from the total capacitor voltages, $u_{CU}^{\Sigma}$ and $u_{CL}^{\Sigma}$, respectively, by applying the insertion indices, $n_U$ and $n_L$, which are controlled by the control system.

$$n_U = \frac{u_{CU}}{u_{CU}^{\Sigma}} \quad 0 \leq n_U \leq 1 \quad (A4)$$

$$n_L = \frac{u_{CL}}{u_{CL}^{\Sigma}} \quad 0 \leq n_L \leq 1$$

In the following, however, the main circuit model will be formulated using the real voltages as variables. If the total capacitor voltages, $u_{CU}^{\Sigma}$ and $u_{CL}^{\Sigma}$, are measured, the corresponding insertion indices can always be obtained from (A4).

The capacitor modules serve as controlled electromotive forces in the circuit. Let the total energy in the capacitors be $W_{CU}^{\Sigma}$ and $W_{CL}^{\Sigma}$ in the upper and lower arms respectively. Inspection of the circuit model in FIG. 2 immediately yields $$\frac{dW_{CU}^{\Sigma}}{dt} = i_U u_{CU} \quad (A5)$$

$$\frac{dW_{CL}^{\Sigma}}{dt} = -i_L u_{CL}$$

In order to gain some more insight it is helpful separate the arms currents in two parts. One part emerges from the AC current, which naturally separates into two halves, one passing though the upper and one passing through the lower arm. The deviation from this "ideal" condition is described by a difference current $i_{diff}$ which passes through the series-connected arms and the DC source.

Define $$i_U = \frac{i_V}{2} + i_{diff} \quad (A6)$$

$$i_L = \frac{i_V}{2} - i_{diff} \Leftrightarrow i_{diff} = \frac{i_U - i_L}{2}$$

The circuit in FIG. 2 now gives the equations $$\frac{u_D}{2} - R\left(\frac{i_V}{2} + i_{diff}\right) - L\left(\frac{1}{2}\frac{di_V}{dt} + \frac{di_{diff}}{dt}\right) - u_{CU} - u_V = 0 \quad (A7)$$

$$-\frac{u_D}{2} - R\left(\frac{i_V}{2} - i_{diff}\right) - L\left(\frac{1}{2}\frac{di_V}{dt} - \frac{di_{diff}}{dt}\right) + u_{CL} - u_V = 0$$

Adding and subtracting the equations give the results $$u_V = \frac{u_{CL} - u_{CU}}{2} - \frac{R}{2}i_V - \frac{L}{2}\frac{di_V}{dt} \quad (A8)$$

$$L\frac{di_{diff}}{dt} + Ri_{diff} = \frac{u_D}{2} - \frac{u_{CL} + u_{CU}}{2}$$

These equations show that
- the AC voltage only depends on the AC current $i_V$ and the difference between the arm voltages $u_{CL}$ and $u_{CU}$
- the arm voltage difference acts as an inner AC voltage in the converter and the inductance L and resistance R form a fix, passive inner impedance for the AC current
- the difference current $i_{diff}$ only depends on the DC link voltage and the sum of the arm voltages
- the difference current $i_{diff}$ can be controlled independently of the AC side quantities by subtracting the same voltage contributions to both arms Define $$e_V = \frac{u_{CL} - u_{CU}}{2} \quad u_{CU} = \frac{u_D}{2} - e_V - u_{diff} \quad (A9)$$

$$u_{diff} = \frac{u_D - u_{CL} - u_{CU}}{2} \Leftrightarrow u_{CL} = \frac{u_D}{2} + e_V - u_{diff}$$

where $e_V$ is the desired inner voltage in the AC voltage source and $u_{diff}$ is a voltage that controls the difference current $i_{diff}$.

Then (8) becomes $$u_V = e_V - \frac{R}{2}i_V - \frac{L}{2}\frac{di_V}{dt} \quad (A10)$$

$$L\frac{di_{diff}}{dt} + Ri_{diff} = u_{diff}$$

Inserting equations (A6) and (A9) in (A5) yields $$\frac{dW_{CU}^{\Sigma}}{dt} = \left(\frac{i_V}{2} + i_{diff}\right)\left(\frac{u_D}{2} - e_V - u_{diff}\right) \quad (A11)$$

$$\frac{dW_{CL}^{\Sigma}}{dt} = \left(-\frac{i_V}{2} + i_{diff}\right)\left(\frac{u_D}{2} + e_V - u_{diff}\right)$$

It makes sense to investigate the total energy stored in all capacitor banks in the whole leg and to examine the balance between the energy in the upper and the lower arm.

Define $$W_C^{\Sigma} = W_{CU}^{\Sigma} + W_{CL}^{\Sigma} \quad W_{CU}^{\Sigma} = \frac{W_C^{\Sigma} + W_C^{\Delta}}{2} \quad (A12)$$

$$W_C^{\Delta} = W_{CU}^{\Sigma} - W_{CL}^{\Sigma} \Leftrightarrow W_{CL}^{\Sigma} = \frac{W_C^{\Sigma} - W_C^{\Delta}}{2}$$

The result is $$\frac{dW_C^\Sigma}{dt} = (u_D - 2u_{diff})i_{diff} - e_V i_V \quad (A13)$$

$$\frac{dW_C^\Delta}{dt} = -2e_V i_{diff} + \left(\frac{u_D}{2} - u_{diff}\right)i_V$$

Equation (A13) indicates that the total energy in both arms as well as the energy balance between the upper and lower arms can be controlled primarily by $i_{diff}$, which is in its turn controlled by $u_{diff}$ through (A10).

The term in the upper equation in (A13) is recognized as the instantaneous power delivered to the AC side.

$$p_V = e_V i_V \quad (A14)$$

Steady State Solution

We shall look at the special case where the AC emf and current is given. Thus let $$e_V = \hat{e}_V \cos \omega t \quad (A15)$$

$$i_V = \hat{i}_V \cos(\omega t + \varphi)$$

Assume that there is a solution where the difference current $i_{diff}$ is a pure dc component. Thus $$i_{diff}(t) = \hat{i}_{diff} \quad (A16)$$

Then, according to (A10)

$$u_{diff}(t) = R\hat{i}_{diff} \quad (A17)$$

The derivative of the total and difference energies the according to (A13) become $$\frac{dW_C^\Sigma}{dt} = (u_D - 2R\hat{i}_{diff})\hat{i}_{diff} - \frac{\hat{e}_V \hat{i}_V}{2}[\cos\varphi + \cos(2\omega t + \varphi)] \quad (A18)$$

$$\frac{dW_C^\Delta}{dt} = -2\hat{e}_V \hat{i}_{diff} \cos\omega t + \left(\frac{u_D}{2} - R\hat{i}_{diff}\right)\hat{i}_V \cos(\omega t + \varphi)$$

From (A18) some observations can immediately be made
the derivative of the total energy contains only a constant and a component having double network frequency
the derivative of the difference energy only contains components having network frequency
Steady-state condition requires that the constant component of the total energy derivative disappears so that $$(u_D - 2R\hat{i}_{diff})\hat{i}_{diff} - \frac{\hat{e}_V \hat{i}_V}{2}\cos\varphi = 0 \quad (A19)$$

$$\hat{i}_{diff} = \frac{\hat{e}_V \hat{i}_V \cos\varphi}{u_D + \sqrt{u_D^2 - 4R\hat{e}_V \hat{i}_V \cos\varphi}}$$

With this difference current the remaining term becomes $$\frac{dW_C^\Sigma}{dt} = -\frac{\hat{e}_V \hat{i}_V}{2}\cos(2\omega t + \varphi) \quad (A20)$$

The steady-state average energy can be freely selected so that the total energy in steady-state becomes $$W_C^\Sigma(t) = W_{C0}^\Sigma - \frac{\hat{e}_V \hat{i}_V}{4\omega}\sin(2\omega t + \varphi) \quad (A21)$$

The expression for the difference energy In (A18) can be directly integrated, also with a freely selectable integration constant (which normally shall be zero)

$$W_C^\Delta(t) = W_{C0}^\Delta - \frac{2\hat{e}_V \hat{i}_{diff}}{\omega}\sin\omega t + \frac{\left(\frac{u_D}{2} - R\hat{i}_{diff}\right)\hat{i}_V}{\omega}\sin(\omega t + \varphi) \quad (A22)$$

The investigation shows that
solutions of the desired type, i.e. with a difference component having only a DC component, exist with freely selectable energy levels in each arm
the steady state solutions for the energy time functions contain only a double frequency component in the total energy and a fundamental frequency component in the difference energy Linearised Model for Control Studies Let us go back and linearise the equations (A13) around a steady state point as described in the preceding section. Assume that the DC link voltage is constant. The $$\frac{d\Delta W_C^\Sigma}{dt} = (u_D - 2R\hat{i}_{diff})\Delta i_{diff} - 2\hat{i}_{diff}\Delta u_{diff} - \Delta p_V \quad (A23)$$

$$\frac{d\Delta W_C^\Delta}{dt} = -2e_V \Delta i_{diff} - i_V \Delta u_{diff} - 2\hat{i}_{diff}\Delta e_V + \left(\frac{u_D}{2} - R\hat{i}_{diff}\right)\Delta i_V$$

Further the differential equation that governs $i_{diff}$ as function of $u_{diff}$ applies so that $$L\frac{d\Delta i_{diff}}{dt} + R\Delta i_{diff} = \Delta u_{diff} \quad (A24)$$

Stability Requirements

When the AC side current is stiff (A23) reduces to $$\frac{d\Delta W_C^\Sigma}{dt} = (u_D - 2R\hat{i}_{diff})\Delta i_{diff} - 2\hat{i}_{diff}\Delta u_{diff} \quad (A25)$$

$$\frac{d\Delta W_C^\Delta}{dt} = -2e_V \Delta i_{diff} - i_V \Delta u_{diff}$$

The linearized equations (A25) show that any control system, which makes the sum of the inserted voltages, $u_{CL}$ and $u_{CU}$, perfectly match the voltage $u_D$ on the DC side, i.e. makes $u_{diff} = 0$, also makes the difference current become zero causing the derivatives of the energies in the arms to vanish. The main circuit in the converter then is marginally stable. Thus is not sufficient to select the inserted voltages in (A9) according to the desired $e_V$, but an $u_{diff}$ that creates stability must also be provided.

Control Law for the Total Capacitor Energy

The equation for the total energy equation can be formulated in the Laplace domain $$\Delta W_C^\Sigma(s) = \frac{1}{s}\left\{\frac{(u_D - 2R\hat{i}_{diff})}{R+sL} - 2\hat{i}_{diff}\right\}\Delta u_{diff}(s) - \frac{\Delta p_V(s)}{s} = \\ = \frac{u_D - 4R\hat{i}_{diff} - 2L\hat{i}_{diff}s}{(R+sL)s}\Delta u_{diff}(s) - \frac{\Delta p_V(s)}{s} \quad (A26)$$

Applying a Proportional Gain in an Energy Controller $$\Delta u_{diff}(s) = K_P\{\Delta W_C^{\Sigma ref}(s) - \Delta W_C^\Sigma(s)\} \quad (A27)$$

yields $$\Delta W_C^\Sigma(s) = \frac{[u_D - 4R\hat{i}_{diff} - 2L\hat{i}_{diff}s]K_P}{(R+sL)s + [u_D - 4R\hat{i}_{diff} - 2L\hat{i}_{diff}s]K_P}\Delta W_C^{\Sigma ref}(s) - \\ - \frac{R+sL}{(R+sL)s + [u_D - 4R\hat{i}_{diff} - 2L\hat{i}_{diff}s]K_P}\Delta p_V(s) \quad (A28)$$

The poles in the above transfer functions are mainly determined by $$s_{1,2}^2 L + u_D K_P = 0 \Leftrightarrow s_{1,2} = \pm j\sqrt{\frac{u_D K_P}{L}} \quad (A29)$$

The control system is investigated for a converter leg in an example converter with the main parameters given in Table 1.

TABLE 1

| Example converter main data | |
| --- | --- |
| 3-ph rated power | 30 MVA |
| rated frequency | 50 Hz |
| line-line voltage | 13.8 kV rms |
| rated phase current | 1255 A rms |
| arm capacitance | 500 μF/arm |
| arm inductance | 3 mH |
| arm resistance | 100 mΩ |

Figure 3:
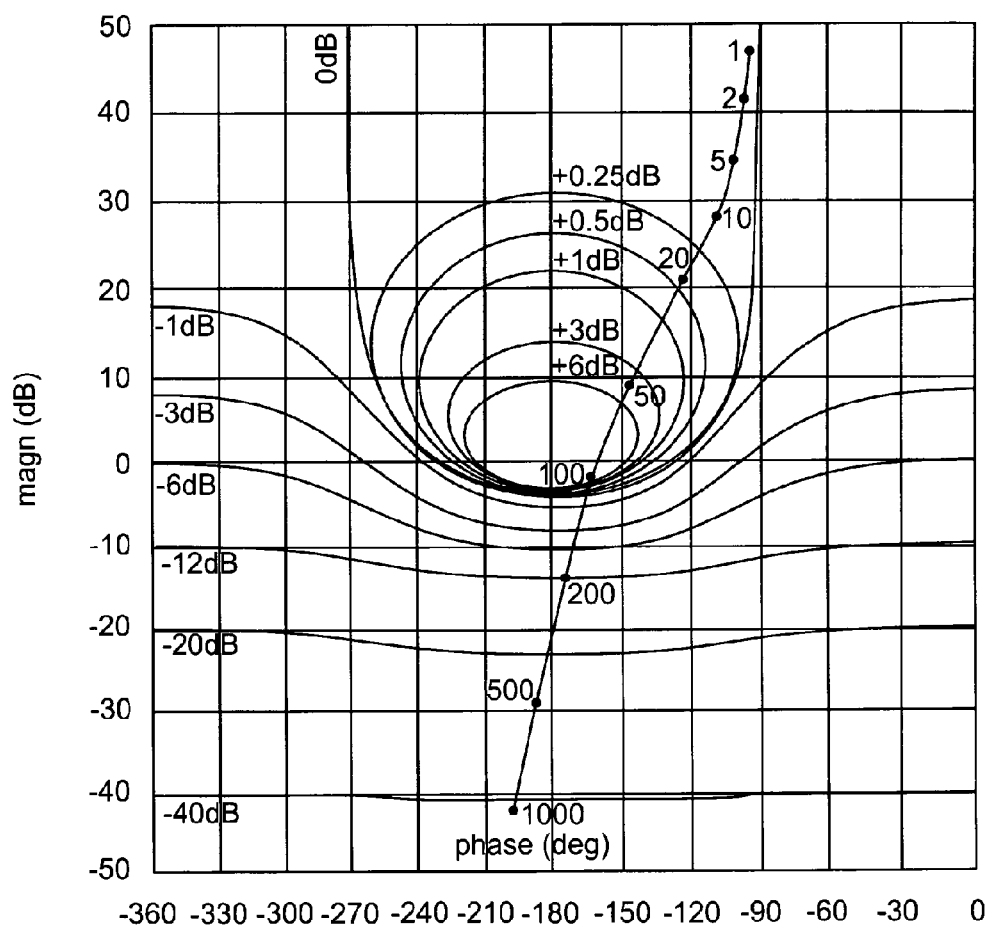
FIG. 3 is a Nichols plot for an open loop transfer function.

FIG. 3 shows the Nichols plot for the open loop transfer function in (A26) with the proportional gain $K_P=0.001$ V/J. The curve is almost independent of the active load.

Figure 4:
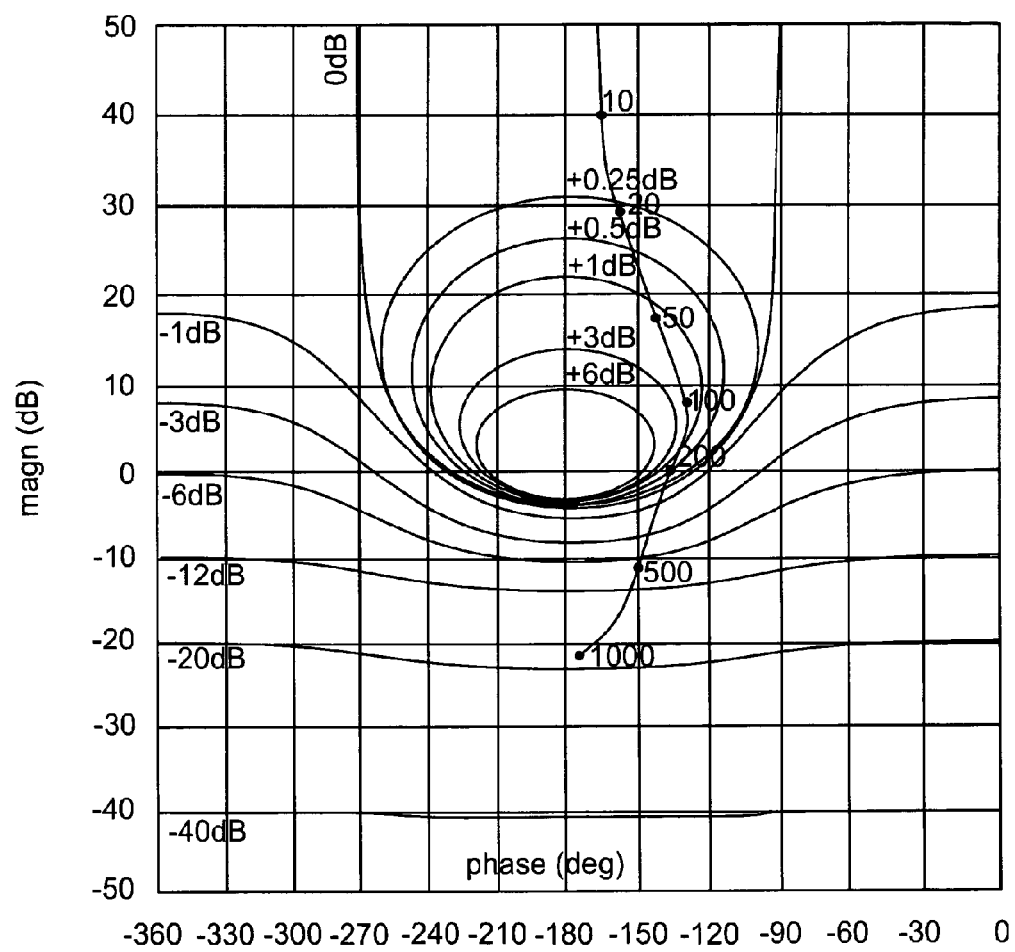
FIG. 4 is a Nichols plot for an open loop transfer function when a PID controller is used.

As expected is the phase margin at 90 rad/s quite small, which means that the response will be quite oscillatory. In FIG. 4 the Nichols plot is shown when a PID controller is used.

The selected transfer function is given by $$F^\Sigma(s) = K_P\left(1 + \frac{K_I}{s} + \frac{sT_D}{1+sT_F}\right) \quad (A30)$$

with $K_P=0.002$ V/J, $K_I=20$ s$^{-1}$, $T_D=10$ ms, $T_F=2$ ms

Figure 5:
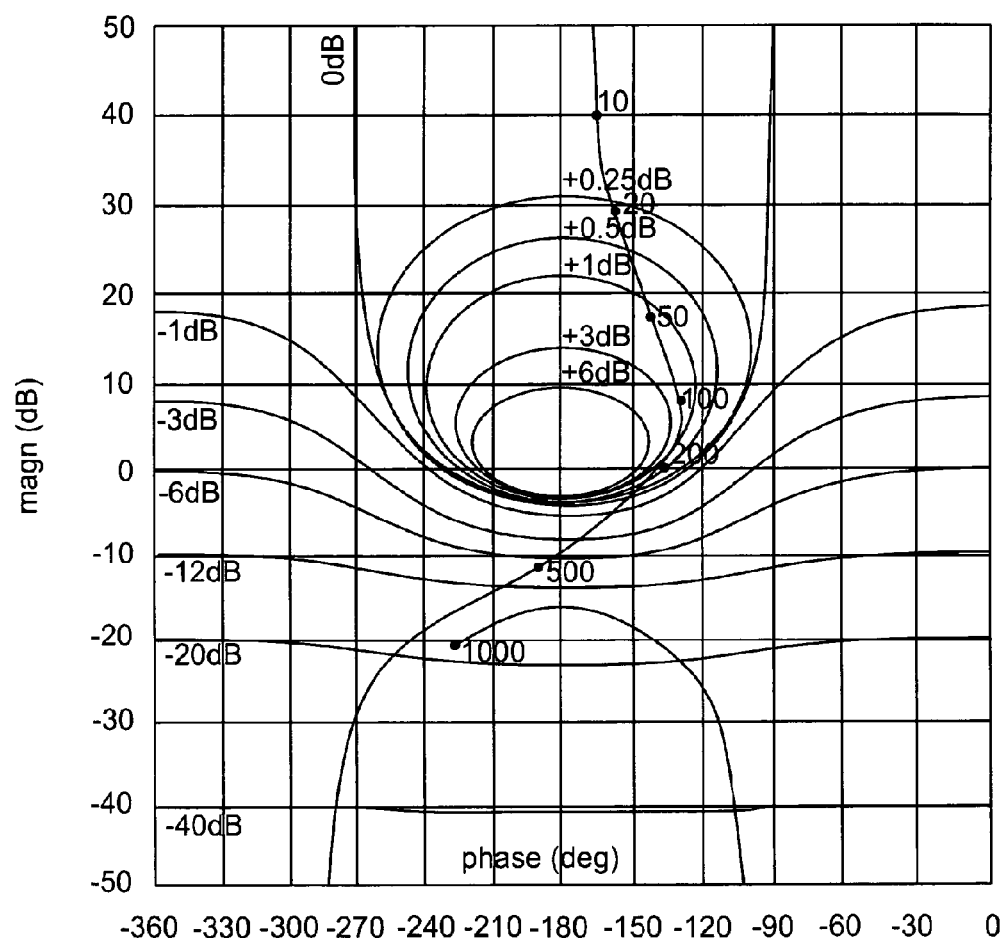
FIG. 5 is a Nichols plot for an open loop transfer function when a PID controller, time delay and notch filter is used.

It has been shown that the total energy response signal contains a frequency component with twice the network frequency. This component can be removed from the controller response using a notch filter. Further it is advisable to assume that a delay occurs in the measured total energy (total capacitor voltage). FIG. 5 shows the corresponding Nicols's diagram where the notch filter and the time delay have been included.

Figure 6:
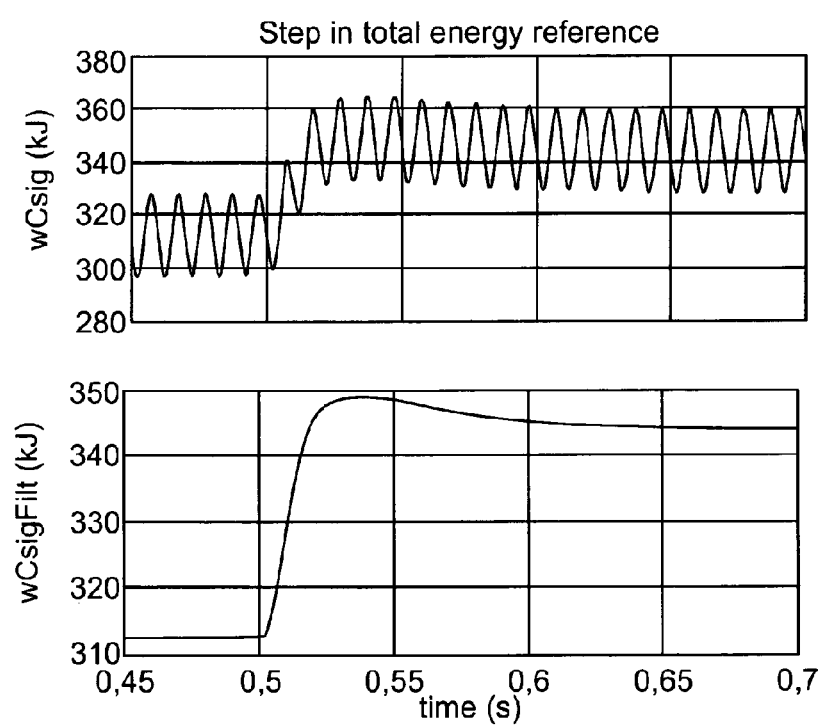
FIG. 6 is a graph showing a simulation result at a step in the reference for the total energy in the converter leg.

The transfer function in FIG. 5 is $$F^\Sigma(s) = K_P\left(1 + \frac{K_I}{s} + \frac{sT_D}{1+sT_F}\right)e^{-sT_{del}}\frac{s^2 + (2\omega_1)^2}{s^2 + 2\zeta(2\omega_1)s + (2\omega_1)^2} \quad (A31)$$

with $K_P=0.002$ V/J, $K_I=20$ s$^{-1}$, $T_D=10$ ms, $T_F=2$ ms, $T_{del}=1$ ms, $\zeta=0.05$ FIG. 6 shows the simulation result at a step in the reference for the total energy in the converter leg.

Equation (A28) shows that the energy control system having only a proportional feedback will have a static error $$\frac{\Delta W_C^\Sigma}{\Delta p_V} = \frac{-R}{K_P(u_D - 4R\hat{i}_{diff})} \quad (A32)$$

For the values in Table 1 together with $K_P=0.002$ V/J this energy dependence becomes approximately 0.002 J/W. Each leg of the converter handles about 10 MW causing the energy drop to be about 20 kJ (out of about 312 kJ) per leg.

Figure 7:
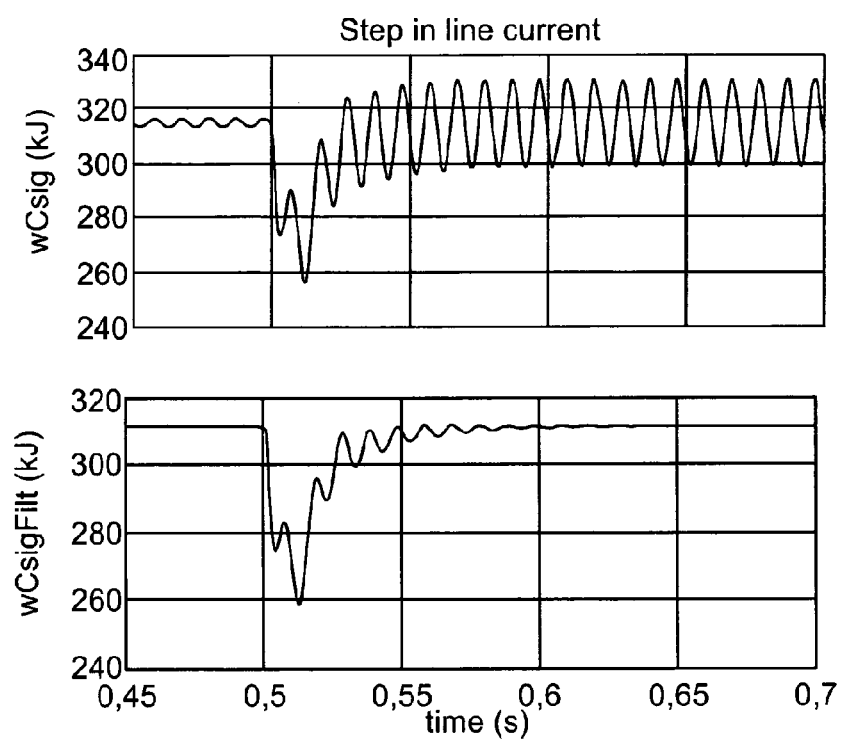
FIG. 7 is a graph showing the simulation result when the current changes from 0.1 pu to 1.0 pu in the converter leg.

FIG. 7 shows the simulation result when the current changes from 0.1 pu to 1.0 pu in the converter leg.

Control Law for Balancing the Capacitor Energies in the Arms

The general differential equation governing the balance between the energies in the upper and the lower arm was derived in (A13)

$$\frac{dW_C^\Delta}{dt} = -2e_V i_{diff} + \left(\frac{u_D}{2} - u_{diff}\right)i_V \quad (A33)$$

It was linearised in (A23)

$$\frac{d\Delta W_C^\Delta}{dt} = -2e_V \Delta i_{diff} - i_V \Delta u_{diff} - 2\hat{i}_{diff}\Delta e_V + \left(\frac{u_D}{2} - R\hat{i}_{diff}\right)\Delta i_V \quad (A34)$$

If we consider linearising around the steady state solution defined by (A15) the linearised equation becomes $$\frac{d\Delta W_C^\Delta}{dt} = -2\hat{e}_V\cos\omega t\Delta i_{diff} - \\ \hat{i}_V\cos(\omega t + \varphi)\Delta u_{diff} - 2\hat{i}_{diff}\Delta e_V + \left(\frac{u_D}{2} - R\hat{i}_{diff}\right)\Delta i_V \quad (A35)$$

Assume first that the AC side quantities are constant. Then $$\frac{d\Delta W_C^\Delta}{dt} = -2\hat{e}_V\cos\omega t\Delta i_{diff} - \hat{i}_V\cos(\omega t + \varphi)\Delta u_{diff} \quad (A36)$$

Further assume that the controller produces a fundamental frequency sinusoidal signal with phase $\zeta$ relative the inner emf in the converter leg $$u_{diff}(t) = \hat{u}_{diff}(t)\cos(\omega t + \xi) \quad (A37)$$

Using the quasi-stationary solution to (A10) yields $$\hat{i}_{diff}(t) = \frac{\hat{u}_{diff}}{\sqrt{R^2 + (\omega L)^2}} \cos(\omega t + \xi - \eta) \quad \text{(A38)}$$

$$\eta = \arg(R + j\omega L)$$

Inserting in (A36) we get $$\frac{d\Delta W_C^\Delta}{dt} = \left\{ -\frac{2\hat{e}_V}{\sqrt{R^2 + (\omega L)^2}} \cos(\omega t)\cos(\omega t + \xi - \eta) - \hat{i}_V \cos(\omega t + \varphi)\cos(\omega t + \xi) \right\} \Delta \hat{u}_{diff} \quad \text{(A39)}$$

The products of the cosine functions in (A39) are DC quantities and terms with the double network frequency. These components are $$a^{(dc)} = \frac{-\hat{e}_V}{\sqrt{R^2 + (\omega L)^2}} \cos(\xi - \eta) - \frac{\hat{i}_V}{2}\cos(\xi - \varphi) \quad \text{(A40)}$$

$$a^{(2\omega)} = \frac{-\hat{e}_V}{\sqrt{R^2 + (\omega L)^2}} \cos(2\omega t + \xi - \eta) - \frac{\hat{i}_V}{2}\cos(2\omega t + \xi + \varphi)$$

The relation between the two terms at various frequencies has been found to show that the first term dominates completely even for operating frequencies down to 5 Hz. Therefore it is sufficient to consider the first term. The maximum DC component then is obtained when $$\xi = \eta = arg(R + j\omega L) \quad \text{(A41)}$$

With this selection of the argument for the inserted difference voltage we get the simplified formula $$\frac{d\Delta W_C^\Delta}{dt} = -\frac{\hat{e}_V}{\sqrt{R^2 + (\omega L)^2}} \Delta \hat{u}_{diff} \quad \text{(A42)}$$

A proportional controller is sufficient to control the balance between the energies as the function is indeed just an integrator. However, the measured difference energy has a strong fundamental frequency component, which should be eliminated in the response to the regulator. Thus the transfer function in the balancing controller is given by $$F^\Delta(s) = K_{P\Delta} \frac{s^2 + \omega_1^2}{s^2 + 2\zeta\omega_1 + \omega_1^2} \quad \text{(A43)}$$

Figure 8:
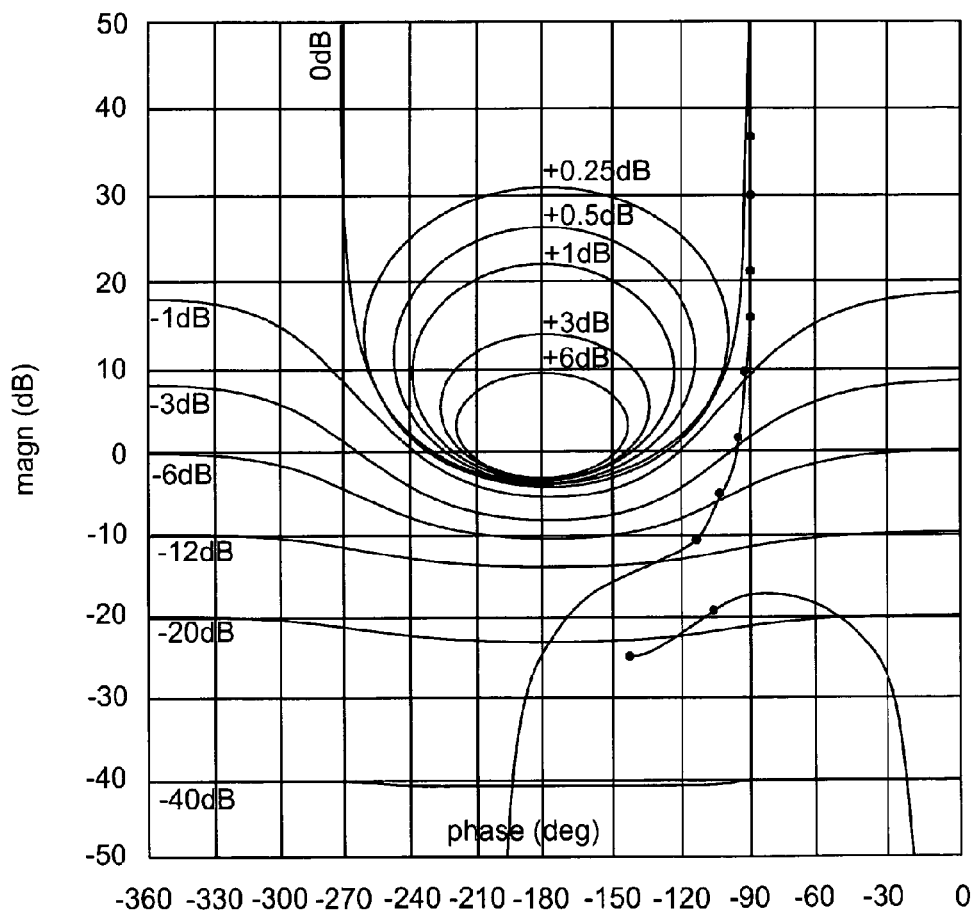
FIG. 8 shows a Nichols plot for a balance controller according to another embodiment.

FIG. 8 shows the Nichols plot for the balance controller with parameters according to Table 1 and with control parameters $K_{P\Delta}$=−0.005 V/J, $t_{Del}$=1 MS, $\zeta$=0.1.

FIG. 5 shows that the closed loop for the energy controller has unity gain up to about 300 rad/s and that it amplifies frequencies in the range 100-200 rad/s with more than 3 dB. Therefore the gain in the balance controller has been kept low for these frequencies in order to avoid interaction between the two controllers.

Appendix 2: Description of Open Loop Control System

The aim of the investigation is to describe an M2C system where the modulation operates in open-loop mode. The meaning of the name "open-loop" in this context is that the modulation system does not measure the total voltage of the capacitors in the phase leg arms. Rather these total voltages are estimated in run-time using the desired AC emf and the measured AC current. The reference for the inserted arm voltages are obtained assuming that the instantaneous AC emf and AC current are steady state values. Further it is assumed that a voltage sharing system is provided to distribute the total arm voltage in each arm evenly between all modules that constitute the arm.

Steady State Analysis

The starting point is that the converter produces a sinusoidal emf $$e_V = \hat{e}_V \cos \omega_1 t \quad \text{(B1)}$$

and is loaded with a sinusoidal phase current $$i_V = \hat{i}_V \cos(\omega_1 t + \phi) \quad \text{(B2)}$$

Under ideal conditions the arm currents only contains a DC component $\hat{i}_{diff0}$ so that the arm currents become $$i_U = \frac{\hat{i}_V}{2} \cos(\omega_1 t + \varphi) + \hat{i}_{diff0} \quad \text{(B3)}$$

$$i_L = \frac{\hat{i}_V}{2} \cos(\omega_1 t + \varphi) - \hat{i}_{diff0}$$

When the difference current is $\hat{i}_{diff0}$ the difference voltage becomes $u_{diff}=R\hat{i}_{diff0}$ so that the arm voltages become $$u_{CU} = \frac{u_D}{2} - \hat{e}_V \cos\omega_1 t - R\hat{i}_{diff0} \quad \text{(B4)}$$

$$u_{CL} = \frac{u_D}{2} + \hat{e}_V \cos\omega_1 t - R\hat{i}_{diff0}$$

The derivatives of the arm energies are $$\frac{dW_{CU}^\Sigma}{dt} = u_{CU} i_U \quad \text{(B5)}$$

$$\frac{dW_{CL}^\Sigma}{dt} = -u_{CL} i_L$$

Inserting the expressions in (B3) and (B4) yields $$\frac{dW_{CU}^\Sigma}{dt} = \left\{ \left(\frac{u_D}{2} - R\hat{i}_{diff0}\right)\hat{i}_{diff0} - \frac{\hat{e}_V \hat{i}_V \cos\varphi}{4} \right\} - \hat{e}_V \hat{i}_{diff0} \cos\omega_1 t + \left(\frac{u_D}{2} - R\hat{i}_{diff0}\right)\frac{\hat{i}_V}{2}\cos(\omega_1 t + \varphi) - \frac{\hat{e}_V \hat{i}_V}{4}\cos(2\omega_1 t + \varphi) \quad \text{(B6)}$$

$$\frac{dW_{CL}^\Sigma}{dt} = \left\{ \left(\frac{u_D}{2} - R\hat{i}_{diff0}\right)\hat{i}_{diff0} - \frac{\hat{e}_V \hat{i}_V \cos\varphi}{4} \right\} + \hat{e}_V \hat{i}_{diff0} \cos\omega_1 t - \left(\frac{u_D}{2} - R\hat{i}_{diff0}\right)\frac{\hat{i}_V}{2}\cos(\omega_1 t + \varphi) - \frac{\hat{e}_V \hat{i}_V}{4}\cos(2\omega_1 t + \varphi) \quad \text{(B7)}$$

In steady state the DC term must be zero. This condition allows us to determine the DC component to $$\hat{i}_{\mathit{diff}0} = \frac{\hat{e}_V \hat{i}_V \cos\varphi}{u_D + \sqrt{u_D^2 - 4R\hat{e}_V \hat{i}_V \cos\varphi}} \quad \text{(B8)}$$

Thus, in steady state, the energy variations are $$\frac{dW_{CU}^\Sigma}{dt} = -\hat{e}_V \hat{i}_{\mathit{diff}0} \cos\omega_1 t + \quad \text{(B9)}$$
$$\left(\frac{u_D}{2} - R\hat{i}_{\mathit{diff}0}\right)\frac{\hat{i}_V}{2}\cos(\omega_1 t + \varphi) - \frac{\hat{e}_V \hat{i}_V}{4}\cos(2\omega_1 t + \varphi)$$

$$\frac{dW_{CL}^\Sigma}{dt} = +\hat{e}_V \hat{i}_{\mathit{diff}0} \cos\omega_1 t - \quad \text{(B10)}$$
$$\left(\frac{u_D}{2} - R\hat{i}_{\mathit{diff}0}\right)\frac{\hat{i}_V}{2}\cos(\omega_1 t + \varphi) - \frac{\hat{e}_V \hat{i}_V}{4}\cos(2\omega_1 t + \varphi)$$

These formulas can immediately be integrated to obtain the instantaneous energy variations. Note that a freely selectable integration constant appears in each expression. Thus $$W_{CU}^\Sigma(t) = W_{CU0}^\Sigma - \frac{\hat{e}_V \hat{i}_{\mathit{diff}0}}{\omega_1}\sin\omega_1 t + \quad \text{(B11)}$$
$$\left(\frac{u_D}{2} - R\hat{i}_{\mathit{diff}0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

$$W_{CL}^\Sigma(t) = W_{CL0}^\Sigma + \frac{\hat{e}_V \hat{i}_{\mathit{diff}0}}{\omega_1}\sin\omega_1 t - \quad \text{(B12)}$$
$$\left(\frac{u_D}{2} - R\hat{i}_{\mathit{diff}0}\right)\frac{\hat{i}_V}{2\omega_1}\sin(\omega_1 t + \varphi) - \frac{\hat{e}_V \hat{i}_V}{4\omega_1}\sin(2\omega_1 t + \varphi)$$

The total capacitor voltages now are given by $$u_{CU}^\Sigma(t) = \sqrt{\frac{2W_{CU}^\Sigma(t)}{C_{arm}}} \quad \text{(B13)}$$
$$u_{CL}^\Sigma(t) = \sqrt{\frac{2W_{CL}^\Sigma(t)}{C_{arm}}}$$

and they can be used to determine the insertion indices in run-time according to $$n_U(t) = \frac{u_{CU}(t)}{u_{CU}^\Sigma(t)} \quad \text{(B14)}$$
$$n_L(t) = \frac{u_{CL}(t)}{u_{CL}^\Sigma(t)}$$

Open-Loop Control

Figure 9:
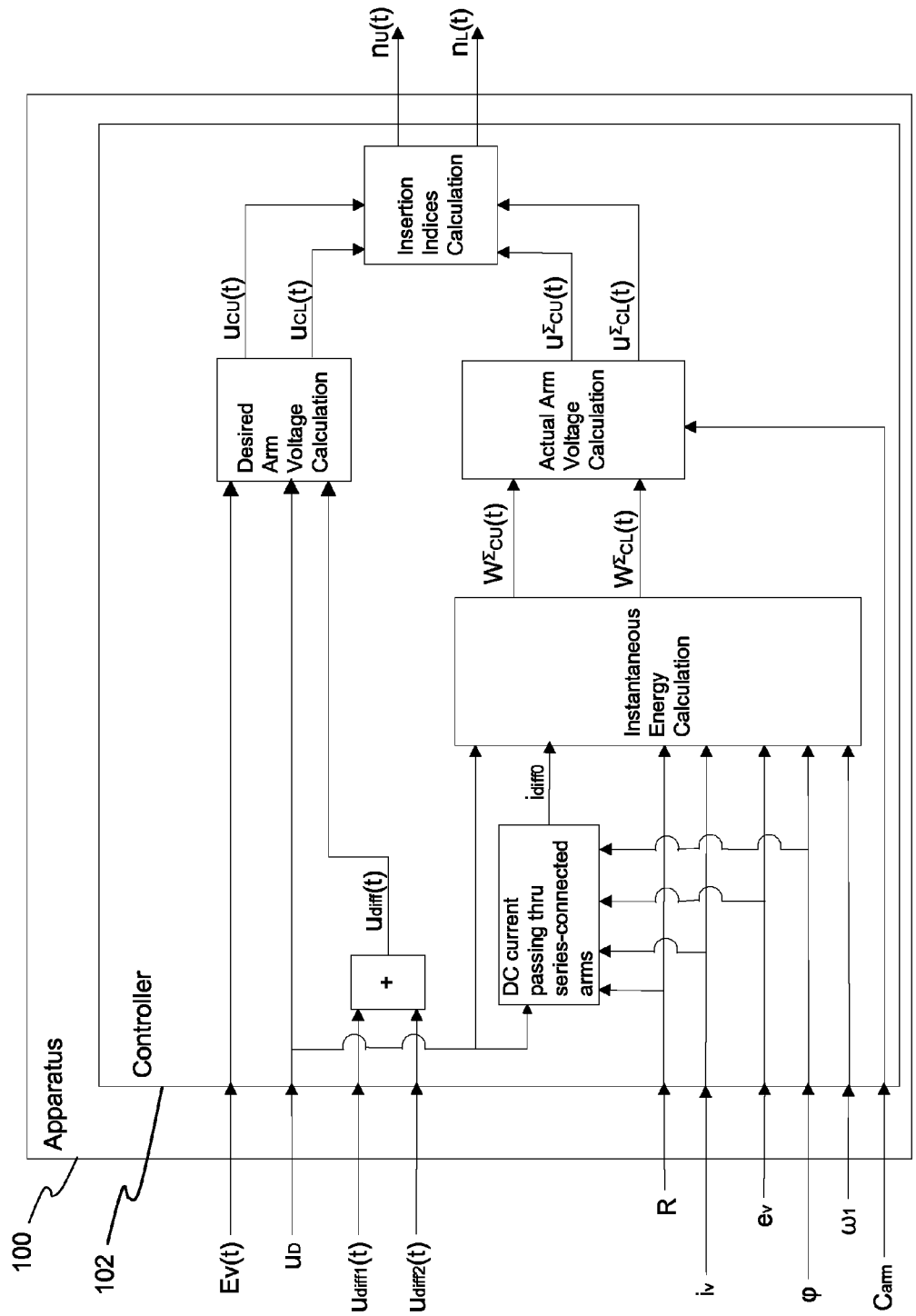
FIG. 9 is a schematic diagram of an apparatus for calculating insertion indices for a phase leg of a DC to AC modular multilevel converter.

The idea of the open-loop control mode is to
measure the AC terminal current
extract the amplitude and phase relative the created emf in the converter as in (B2)
perform the calculation as described above
utilize the so obtained insertion indices according to (B14) in the converter FIG. 9 shows an apparatus 100 for calculating insertion indices for a phase leg of the M2C illustrated in FIG. 1. The apparatus 100 comprises a controller 102 arranged to calculate a desired arm voltage for the upper arm 5 connected to the upper DC source common bar and the lower arm 6 connected to the lower DC source common bar, to obtain values representing actual total arm voltages in the upper arm 5 and lower arm 6, respectively, and to calculate modulation indices for the upper arm 5 and lower arm 6, respectively, using the respective desired arm voltage and the respective value representing the total actual arm voltage. The controller 102 performs the steps of calculating the desired arm voltages for a phase leg, obtaining values representing actual arm voltages, and calculating insertion indices by using the methods discussed above.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for calculating insertion indices for a phase leg of a DC to AC modular multilevel converter via a control apparatus, said control apparatus having at east one controller, the converter comprising one phase leg between upper and lower DC source common bars for each phase, each phase leg comprising two serially connected arms, wherein an AC output for each phase leg is connected between the two serially connected arms, wherein each arm comprises a number of submodules, wherein each submodule can be in a bypass state or a voltage insert mode, the insertion index comprising data representing a portion of available submodules that should be in the voltage insert mode for a particular arm, the method comprising the steps of:

calculating, in said controller, a desired arm voltage for an upper arm connected to the upper DC source common bar and a lower arm connected to the lower DC source common bar, obtaining, in said controller, values representing actual total arm voltages in the upper arm and lower arm, respectively, and calculating, in said controller, insertion indices for the upper and lower arm, respectively, using the respective desired arm voltage and the respective value representing the total actual arm voltage;

wherein the step of calculating desired arm voltages for a phase leg comprises calculating $$u_{CU}(t)=u_D/2-e_V(t)-u_{\mathit{diff}}(t)$$

for the upper arm, and calculating $$u_{CL}(t)=u_D/2+e_V(t)-u_{\mathit{diff}}(t)$$

for the lower arm, where $u_{CU}(t)$ represents desired upper arm voltage where $u_{CL}(t)$ represents desired lower arm voltage, $u_D$ represents a voltage between the upper and lower DC source common bars, $e_V(t)$ represents a reference inner AC output voltage and $u_{\mathit{diff}}(t)$ represents a control voltage to control a current passing through the whole phase leg, and calculating $$u_{\mathit{diff}}(t)=u_{\mathit{diff}1}(t)+u_{\mathit{diff}2}(t)$$

where $u_{\mathit{diff}1}(t)$ represents a voltage obtained by summing energy in the arms of the leg and $u_{\mathit{diff}2}(t)$ represents a voltage obtained by calculating a difference in energy between the arms of the leg.

2. The method according to claim 1, wherein the step of obtaining a value representing actual arm voltage comprises calculating $$u_{\mathit{diff}2}(t)=\hat{u}_{\mathit{diff}2}\cos(\omega_1 t+\psi)$$

where $\hat{u}_{\mathit{diff}2}$ represents a difference between total upper arm energy and total lower arm energy, $\omega_1$ represents the angular velocity of the network frequency and $\psi$ represents the angle given by $\psi=\angle(R+j\omega_1 L)$ where R represents the resistance of the converter arm and L represents the inductance of the converter arm.

3. The method according to claim 1, wherein the step of obtaining a value representing actual total arm voltage comprises measuring voltages of the submodules of the arm and summing these measured voltages.

4. The method according to claim 1, wherein the insertion index comprises data representing a direction of the inserted voltage.

5. A method for calculating insertion indices for a phase leg of a DC to AC modular multilevel converter via a control apparatus, said control apparatus having at least one controller, the converter comprising one phase leg between upper and lower DC source common bars for each phase, each phase leg comprising two serially connected arms, wherein an AC output for each phase leg is connected between the two serially connected arms, wherein each arm comprises a number of submodules, wherein each submodule can be in a bypass state or a voltage insert mode, the insertion index comprising data representing a portion of available submodules that should be in the voltage insert mode for a particular arm, the method comprising the steps of:

calculating, in said controller, a desired arm voltage for an upper arm connected to the upper DC source common bar and a lower arm connected to the lower DC source common bar, obtaining, in said controller, values representing actual total arm voltages in the upper arm and lower arm, respectively, and calculating, in said controller, insertion indices for the upper and lower arm, respectively, using the respective desired arm voltage and the respective value representing the total actual arm voltage;

wherein the step of calculating desired arm voltages for a phase leg comprises calculating $$u_{CU}(t)=u_D/2-e_V(t)-u_{diff}(t)$$

for the upper arm, and calculating $$u_{CL}(t)=u_D/2+e_V(t)-u_{diff}(t)$$

for the lower arm, where $u_{CU}(t)$ represents desired upper arm voltage where $u_{CL}(t)$ represents desired lower arm voltage, $u_D$ represents a voltage between the upper and lower DC source common bars, $e_V(t)$ represents a reference inner AC output voltage and $u_{diff}(t)$ represents a control voltage to control a current, $iV(t)$, passing through the whole phase leg, wherein the step of obtaining values representing actual arm voltages comprises:

calculating $u_{CU}^\Sigma(t)$, actual total voltage for the upper arm, using $C_{arm}$, capacitance for the upper arm, $\hat{i}_{diff0}$, DC current passing through the two serially connected arms of the phase leg, $W_{CU}^\Sigma(t)$, desired average energy in the upper arm, $\hat{e}_V$, amplitude of reference for the inner AC output voltage, $\hat{i}_V$, amplitude of AC output current, $\phi$, a phase difference between $i_V(t)$ and $e_V(t)$, and calculating $u_{CL}^\Sigma(t)$, actual total voltage for the lower arm, using $C_{arm}$, capacitance for the lower arm, $\hat{i}_{diff0}$, DC current passing through the two serially connected arms of the phase leg, $W_{CL}^\Sigma(t)$, desired average energy in the lower arm, $\hat{e}_V$, amplitude of reference for inner AC output voltage, $\hat{i}_V$, amplitude of AC output current, $\phi$, a phase difference between $i_V(t)$ and $e_V(t)$.

6. The method according to claim 5, wherein the step of obtaining a value representing actual arm voltage comprises calculating $$\hat{i}_{diff0} = \frac{\hat{e}_V \hat{i}_V \cos\varphi}{u_D + \sqrt{u_D^2 - 4R\hat{e}_V \hat{i}_V \cos\varphi}}$$

where $\phi$ represents a phase difference between $i_V(t)$ and $e_V(t)$, $u_D$ represents a voltage between the upper and lower DC source common bars and R represents the resistance of the converter arm.

7. The method according to claim 6, wherein the step of obtaining a value representing actual arm voltage comprises calculating $$u_{CU}^\Sigma(t) = \sqrt{\frac{2W_{CU}^\Sigma(t)}{C_{arm}}}$$

where $W_{CU}^\Sigma(t)$ is calculated as follows:

$$W_{CU}^\Sigma(t) = W_{CU0}^\Sigma - \frac{\hat{e}_V \hat{i}_{diff0}}{\omega_1}\sin\omega_1 t + \left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

and calculating $$u_{CL}^\Sigma(t) = \sqrt{\frac{2W_{CL}^\Sigma(t)}{C_{arm}}}$$

where $W_{CL}^\Sigma(t)$ is calculated as follows:

$$W_{CL}^\Sigma(t) = W_{CL0}^\Sigma + \frac{\hat{e}_V \hat{i}_{diff0}}{\omega_1}\sin\omega_1 t - \left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

where $\omega_1$ represents the angular velocity of the network frequency.

8. An apparatus for calculating insertion indices for a phase leg of a DC to AC modular multilevel converter, the converter comprising one phase leg between upper and lower DC source common bars for each phase, each phase leg comprising two serially connected arms, wherein an AC output for each phase leg is connected between the two serially connected arms, wherein each arm comprises a number of submodules, wherein each submodule can be in a bypass state or a voltage insert mode, the insertion index comprising data representing a portion of available submodules that should be in the voltage insert mode for a particular arm, the apparatus comprises:

a controller arranged to calculate a desired arm voltage for an upper arm connected to the upper DC source common bar and a lower arm connected to the lower DC source common bar, to obtain values representing actual total arm voltages in the upper arm and lower arm, respectively, and to calculate insertion indices for the upper and lower arm, respectively, using the respective desired arm voltage and the respective value representing the total actual arm voltage;
wherein the calculating of desired arm voltages for a phase leg comprises calculating $$u_{CU}(t)=u_D/2-e_V(t)-u_{diff}(t)$$

for the upper arm, and calculating $$u_{CL}(t)=u_D/2+e_V(t)-u_{diff}(t)$$

for the lower arm, where $u_{CU}(t)$ represents desired upper arm voltage, $u_{CL}(t)$ represents desired lower arm voltage, $u_D$ represents a voltage between the upper and lower DC source common bars, $e_V(t)$ represents a reference inner AC output voltage and $u_{diff}(t)$ represents a control voltage to control a current passing through the whole phase leg, and calculating $$u_{diff}(t)=u_{diff1}(t)+u_{diff2}(t)$$

where $u_{diff1}(t)$ represents a voltage obtained by summing energy in the arms of the leg and $u_{diff2}(t)$ represents a voltage obtained by calculating a difference in energy between the arms of the leg.

9. An apparatus for calculating insertion indices for a phase leg of a DC to AC modular multilevel converter, the converter comprising one phase leg between upper and lower DC source common bars for each phase, each phase leg comprising two serially connected arms, wherein an AC output for each phase leg is connected between the two serially connected arms, wherein each arm comprises a number of submodules, wherein each submodule can be in a bypass state or a voltage insert mode, the insertion index comprising data representing a portion of available submodules that should be in the voltage insert mode for a particular arm, the apparatus comprises:
   a controller arranged to calculate a desired arm voltage for an upper arm connected to the upper DC source common bar and a lower arm connected to the lower DC source common bar, to obtain values representing actual total arm voltages in the upper arm and lower arm, respectively, and to calculate insertion indices for the upper and lower arm, respectively, using the respective desired arm voltage and the respective value representing the total actual arm voltage;
wherein the calculating of desired arm voltages for a phase leg comprises calculating $$u_{CU}(t)=u_D/2-e_V(t)-u_{diff}(t)$$

for the upper arm, and calculating $$u_{CL}(t)=u_D/2+e_V(t)-u_{diff}(t)$$

for the lower arm, where $u_{CU}(t)$ represents desired upper arm voltage, $u_{CL}(t)$ represents desired lower arm voltage, $u_D$ represents a voltage between the upper and lower DC source common bars, $e_V(t)$ represents a reference inner AC output voltage and $u_{diff}(t)$ represents a control voltage to control a current, iV(t), passing through the whole phase leg,
   wherein the step of obtaining values representing actual arm voltages comprises:
      calculating $u_{CU}^{\Sigma}(t)$, actual total voltage for the upper arm, using $C_{arm}$, capacitance for the upper arm, $\hat{i}_{diff0}$, DC current passing through the two serially connected arms of the phase leg, $W_{CU}^{\Sigma}(t)$, desired average energy in the upper arm, $\hat{e}_V$, amplitude of reference for the inner AC output voltage, $\hat{i}_V$, amplitude of AC output current, $\varphi$, a phase difference between $i_V(t)$ and $e_V(t)$, and
      calculating $u_{CL}^{\Sigma}(t)$, actual total voltage for the lower arm, using $C_{arm}$, capacitance for the lower arm, $\hat{i}_{diff0}$, DC current passing through the two serially connected arms of the phase leg, $W_{CL}^{\Sigma}(t)$, desired average energy in the lower arm, $\hat{e}_V$, amplitude of reference for inner AC output voltage, $\hat{i}_V$, amplitude of AC output current $\varphi$, a phase difference between $i_V(t)$ and $e_V(t)$.

10. The apparatus of claim 9, wherein the step of obtaining a value representing actual arm voltage comprises calculating $$\hat{i}_{diff0} = \frac{\hat{e}_V \hat{i}_V \cos\varphi}{u_D + \sqrt{u_D^2 - 4R\hat{e}_V \hat{i}_V \cos\varphi}}$$

where R represents the resistance of the converter arm.

11. The apparatus of claim 10, wherein the step of obtaining a value representing actual arm voltage comprises calculating $$u_{CU}^{\Sigma}(t) = \sqrt{\frac{2W_{CU}^{\Sigma}(t)}{C_{arm}}}$$

where $W_{CU}^{\Sigma}(t)$ is calculated as follows:

$$W_{CU}^{\Sigma}(t) = W_{CU0}^{\Sigma} - \frac{\hat{e}_V \hat{i}_{diff0}}{\omega_1}\sin\omega_1 t + \left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

and calculating $$u_{CL}^{\Sigma}(t) = \sqrt{\frac{2W_{CL}^{\Sigma}(t)}{C_{arm}}}$$

where $W_{CL}^{\Sigma}(t)$ is calculated as follows:

$$W_{CL}^{\Sigma}(t) = W_{CL0}^{\Sigma} + \frac{\hat{e}_V \hat{i}_{diff0}}{\omega_1}\sin\omega_1 t - \left(\frac{u_D}{2} - R\hat{i}_{diff0}\right)\frac{\hat{i}_V}{2\omega_1}\sin(\omega_1 t + \varphi) - \frac{\hat{e}_V \hat{i}_V}{8\omega_1}\sin(2\omega_1 t + \varphi)$$

where $\omega_1$ represents the angular velocity of the network frequency.

* * * * *